US006950072B2

(12) United States Patent
Miyata et al.

(10) Patent No.: US 6,950,072 B2
(45) Date of Patent: Sep. 27, 2005

(54) SURFACE MOUNT ANTENNA, ANTENNA DEVICE USING THE SAME, AND COMMUNICATION DEVICE

(75) Inventors: Akira Miyata, Yokohama (JP); Hisashi Akiyama, Yokohama (JP); Kazunari Kawahata, Machida (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 121 days.

(21) Appl. No.: 10/688,876

(22) Filed: Oct. 21, 2003

(65) Prior Publication Data

US 2004/0085245 A1 May 6, 2004

(30) Foreign Application Priority Data

Oct. 23, 2002 (JP) ....................................... 2002-308480
Sep. 9, 2003 (JP) ....................................... 2003-316853

(51) Int. Cl.[7] ................................................ G01Q 1/24
(52) U.S. Cl. ............................... 343/702; 343/700 MS
(58) Field of Search .......................... 343/702, 700 MS, 343/845, 846, 787, 788, 795

(56) References Cited

U.S. PATENT DOCUMENTS 5,767,811 A * 6/1998 Mandai et al. .............. 343/702
6,664,930 B2 * 12/2003 Wen et al. .................. 343/702
6,812,896 B2 * 11/2004 Wallace et al. ............. 343/702
2002/0075190 A1 6/2002 Ghosh et al.
2003/0058173 A1 * 3/2003 Yoon .......................... 343/702
2003/0218573 A1 * 11/2003 Yoo et al. .................. 343/702

FOREIGN PATENT DOCUMENTS

| | | |
|---|---|---|
| EP | 0 938 158 A2 | 8/1999 |
| EP | 1 248 317 | 10/2002 |
| GB | 2 359 929 | 9/2001 |
| JP | 2001-217631 | 8/2001 |
| JP | 2002-026624 | 1/2002 |
| JP | 2002-158529 | 5/2002 |
| WO | WO 99/22420 | 5/1999 |

* cited by examiner

*Primary Examiner*—Hoanganh Le
*Assistant Examiner*—Huedung X. Cao
(74) *Attorney, Agent, or Firm*—Keating & Bennett, LLP

(57) ABSTRACT

A surface mount antenna includes a loop-shaped radiation electrode arranged so as to be extended over a plurality of surfaces of a dielectric substrate. The front end side of the loop-shaped radiation electrode is branched to provide a plurality of branched radiation electrodes. One side end of the radiation electrode functions as a electric feeding portion connected to an external circuit. One of the branched radiation electrodes is an in-loop branched radiation electrode which is surrounded by a loop-shaped electrode portion including the radiation electrode portion extended from the feeding portion of the radiation electrode to a branching portion and the other branched radiation electrode connected to the radiation electrode portion, the in-loop branched radiation electrode being positioned at an interval from the loop-shaped electrode. A capacitance is generated between the one of the branched radiation electrodes and the radiation electrode portion extended from the feeding portion of the radiation electrode to the branching portion.

19 Claims, 15 Drawing Sheets

SURFACE MOUNT ANTENNA, ANTENNA DEVICE USING THE SAME, AND COMMUNICATION DEVICE

BACKGROUND OF THE INVENTION

1. Field of the Invention

The present invention relates to a surface mount antenna including a radiation electrode disposed on a dielectric substrate, an antenna device including such an antenna, and a communication device 2. Description of the Related Art Recently, great attention has been paid to a multi-band antenna in which radio communication can be carried out in a plurality of frequency bands by use of one antenna. For example, a radiation electrode which carries out antenna-operation has plural resonance modes having different resonance frequencies. Thus, multi-band antennas are used to perform radio communication in plural frequency bands by utilization of the plurality of resonance modes of the radiation electrode (see Japanese Unexamined Patent Application Publication No. 2002-26624 (Patent Document 1), European Patent Application Publication No. EP 0938158 A2 Specification (Patent Document 2), International Publication No. WO99/22420 Pamphlet (Patent Document 3), and Japanese Unexamined Patent Application Publication No. 2002-158529 Patent Document 4).

Generally, for the multi-band antennas using plural resonance modes of a radiation electrode, the resonance in the fundamental mode and higher-order modes is used. That is, the frequency of the fundamental mode resonance is lowest in the plural resonance modes of the radiation electrode, and the frequencies of the higher-order mode resonance are higher compared to the frequency of the fundamental mode resonance. Thus, the radiation electrode is set as follows: the fundamental mode resonance of the radiation electrode is carried out in the lower frequency band of plural frequency bands set for radio communication, and the higher-order mode resonance of the radiation electrode is carried out in the higher frequency band of the plural frequency bands set for radio communication.

However, for example, for small-sized antennas such as surface mount antennas, it is difficult to independently control the fundamental mode resonance of the radiation electrode and the higher-order mode. For example, there are some cases in which the fundamental mode resonance can be satisfactorily carried out, but the higher-order mode resonance is insufficient. Thus, it is difficult to form the radiation electrode so that both of the fundamental mode resonance and the higher-order mode resonance can be satisfactorily carried out.

SUMMARY OF THE INVENTION

In order to overcome the problems described above, preferred embodiments of the present invention provide a surface mount antenna with which the resonance in the fundamental mode of a radiation electrode and that in a higher-order mode thereof can be controlled separately from each other, and thus, radio communication in plural frequency bands can be easily carried out as set in advance. In addition, preferred embodiments of the present invention provide an antenna device including such a novel surface mount antenna and a communication device including the antenna device.

According to a preferred embodiment of the present invention, a surface mount antenna includes a dielectric substrate and a radiation electrode operative to carry out antenna-operation and having a loop-shape so as to be extended over a plurality of surfaces of the dielectric substrate, the radiation electrode including an electric feeding portion disposed on one side thereof and connected to an external circuit, the radiation electrode being branched in a branching portion existing on a path from the feeding portion to another end so as to provide a plurality of branched radiation electrodes, one of the branched radiation electrodes being an in-loop branched radiation electrode which is surrounded by a loop-shaped electrode including the radiation electrode portion extended from the feeding portion to the branching portion and another branched radiation electrode being connected to the radiation electrode portion, the in-loop branched radiation electrode being spaced from the loop-shaped electrode portion, the in-loop branched radiation electrode and the radiation electrode portion being extended from the feeding portion to the branching portion so as to form a capacitance therebetween, and at least front ends of the respective branched radiation electrodes being arranged on different surfaces of the dielectric substrate.

Also, according to another preferred embodiment of the present invention, an antenna device includes a substrate and a surface mount antenna having the unique construction of preferred embodiments of the present invention and disposed on the substrate of the antenna device, the substrate having a ground electrode provided at least in an area excluding a mounting area of the surface mount antenna, and the surface mount antenna being provided on a non-ground area of the substrate.

In addition, according to another preferred embodiment of the present invention, a communication device includes a surface mount antenna or antenna device having the unique construction of preferred embodiments of the present invention.

In the surface mount antenna or antenna device of preferred embodiments of the present invention, the loop-shaped radiation electrode is branched in the branching portion existing on a path from the feeding portion to another end to provide a plurality of branched radiation electrodes, and at least front ends of the respective branched radiation electrodes are arranged on different surfaces of the dielectric substrate so as to be separated from each other. Thus, for example, one of the branched radiation electrodes is preferably arranged so that the electromagnetic coupling to the radiation electrode portion extended from the feeding portion to the branching portion is stronger than that of the other branched radiation electrode. Accordingly, the branched radiation electrode of which the electromagnetic coupling to the radiation electrode extended from the feeding portion to the branching portion is stronger can function as a radiation electrode for controlling a higher-order mode. That is, it has been revealed that the resonant frequency or other characteristics of the higher-order mode can be controlled by adjustment of the capacitance (electromagnetic coupling degree) between the open end of the loop-shaped radiation electrode and the portion of the radiation electrode opposed to the open end. According to preferred embodiments of the present invention, the loop-shaped radiation electrode has a configuration such that it is branched in the branching portion existing on a path from the feeding portion to the other end side to define the plurality of branched radiation electrodes, and one of the branched radiation electrodes can function as a radiation electrode for controlling the higher-order mode. Thus, the resonant frequency or matching in the higher-order mode of the radiation electrode can be controlled without hazardous influences being exerted over the fundamental mode by using the branched radiation electrode for controlling the higher-order mode. Thereby, a radiation electrode that reliably performs antenna-operation in the fundamental mode and the higher-order mode set in advance can be easily provided. Moreover, the radiation electrode can correspond to a new design when it is changed, easily and rapidly.

Moreover, according to preferred embodiments of the present invention, one of the branched radiation electrodes is an in-loop branched radiation electrode which is surrounded by the loop-shaped electrode including the radiation electrode portion extended from the feeding portion to the branching portion and another branched radiation electrode connected to the radiation electrode portion, the in-loop branched radiation electrode being spaced from the loop-shaped electrode portion. Therefore, the electric field of the in-loop branched radiation electrode can be confined in the loop of the in-loop branched radiation electrode. Therefore, for example, even if an object such as a human body or the like which can act as a ground approaches the antenna, which creates a problem in that the electric field of the radiation electrode is strongly attracted to the ground object, can be avoided. That is, the antenna can be prevented from suffering external hazardous influences.

Moreover, according to preferred embodiments of the present invention, the radiation electrode is branched in the branching portion existing on a path from one end side (feeding portion) to the other end side (i.e., open end side) to form a plurality of branched radiation electrodes. In other words, the open end side of the radiation electrode is separated into a plurality of electrodes, that is, the plurality of branched radiation electrodes. The capacitance between the open end of the radiation electrode and the ground can be reduced by setting the arrangement and positions of the open ends of the respective branched radiation electrodes. This can cause the antenna efficiency and the bandwidth to be enhanced.

Furthermore, according to preferred embodiments of the present invention, the radiation electrode preferably has a loop-shaped configuration. Thus, the effective length of the radiation electrode can be easily increased, resulting in a larger electrical length, which is carried out on the dielectric substrate of which the size has a limitation. Moreover, a capacitance can be provided between the radiation electrode extended from the feeding portion to the branching portion and the branched radiation electrode. Thus, an inductance (electrical length) is applied to the radiation electrode by the capacitance. According to this configuration, the inductance of the radiation electrode can be increased. Thus, the sizes of the surface mount antenna, the antenna device including the surface mount antenna, and the communication device including the antenna device can be easily reduced.

Preferably, at least the front end of the in-loop branched radiation electrode is surrounded by the radiation electrode portion extended from the feeding portion to the branching portion at an interval from the radiation electrode portion, and the interval between the in-loop branched radiation electrode and the portion of the radiation electrode adjacent to the in-loop branched radiation electrode and positioned relatively near the feeding portion is larger than the interval between the in-loop branched radiation electrode and the portion of the radiation electrode adjacent to the in-loop branched radiation electrode and positioned relatively far from the feeding portion. Thereby, a strong electric field can be generated in the loop defined by the in-loop branched radiation electrode and the portion of the radiation electrode adjacent to the in-loop branched radiation electrode and being relatively far from the feeding portion. Accordingly, deterioration of the antenna characteristic, which may be caused by the influences of a human body or other object that can act as a ground, can be prevented as described above. In addition, the matching of a higher-order mode and the antenna efficiency can be easily enhanced.

Furthermore, in the case in which the length of the slit portion positioned nearer the feeding portion than the in-loop branched radiation electrode and extended along the in-loop branched radiation electrode is larger than that of the slit portion positioned farther from the feeding portion than the in-loop branched radiation electrode and extended along the in-loop branched radiation electrode, a strong electric field can be generated in concentration between the in-loop branched radiation electrode and the radiation electrode existing on the feeding electrode side. Thereby, the electric field can be prevented from being attracted toward the ground, even if a human body or other object approaches the antenna. Thus, the change of the antenna characteristic, which may be caused by the influence of a human body or other object, can be reduced.

Preferably, the non-feeding radiation electrode arranged to generate a double resonance state together with the loop-shaped radiation electrode in a higher-order mode is provided. In this case, the bandwidth in the higher-order mode of the radiation electrode can be increased due to the double resonance state caused by the loop-shaped radiation electrode and the non-feeding radiation electrode. Referring to the antenna device having the surface mount antenna having the non-feeding radiation electrode mounted on the substrate, even if the electrical length of the non-feeding radiation electrode disposed on the dielectric substrate of the surface mount antenna is smaller than the electrical length corresponding to a set resonant frequency, the short electrical length can be compensated by connecting the non-feeding radiation electrode to the ground electrode via a circuit having an inductance provided on the substrate. Thus, the operation of the non-feeding radiation electrode can be carried out as set in advance. This can contribute to the reduction of the size of the surface mount antenna.

Moreover, preferably, the frequency-adjusting portions for adjusting the resonant frequency of the radiation electrode are provided. In this case, even if the resonant frequency of the radiation electrode deviates from a designed one, which may be caused by low processing-accuracy or other problems, the resonant frequency can be adjusted by use of the frequency-adjusting portions. Thus, a surface mount antenna having a high reliability of the antenna-characteristic, an antenna device including such a surface-mount antenna, and a communication device including the antenna device can be provided.

Preferably, cut-ins for controlling the resonant frequency of the higher-order mode of the radiation electrode are provided. In this case, not only the resonance in the higher-order mode of which the frequency is lowest in the plural resonance states of higher-order modes but also the resonance in a higher-order mode of which the frequency is higher than the above-mentioned one can be easily controlled.

Moreover, the above described excellent advantages can be also obtained in the case in which one of the branched radiation electrodes is provided on the upper surface of the dielectric substrate, and another branched radiation electrode is provided on a side surface of the dielectric substrate, or the in-loop branched radiation electrode has a large width.

Other features, elements, characteristics and advantages of the present invention will become more apparent from the following detailed description of preferred embodiments with reference to the attached drawings.

DETAILED DESCRIPTION OF PREFERRED EMBODIMENTS

Hereinafter, preferred embodiments of the present invention will be described with reference to the accompanying drawings.

Figure 1A:
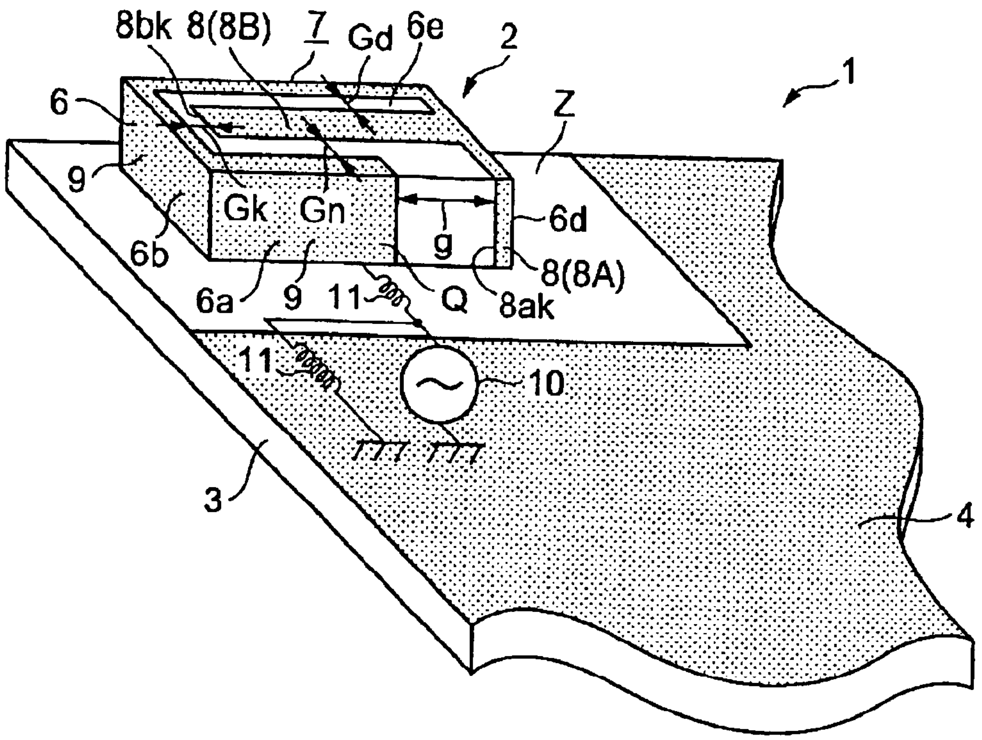
FIGS. 1A and 1B illustrate a surface mount antenna according to a first preferred embodiment of the present invention, and an antenna device including the same.
Figure 1B:
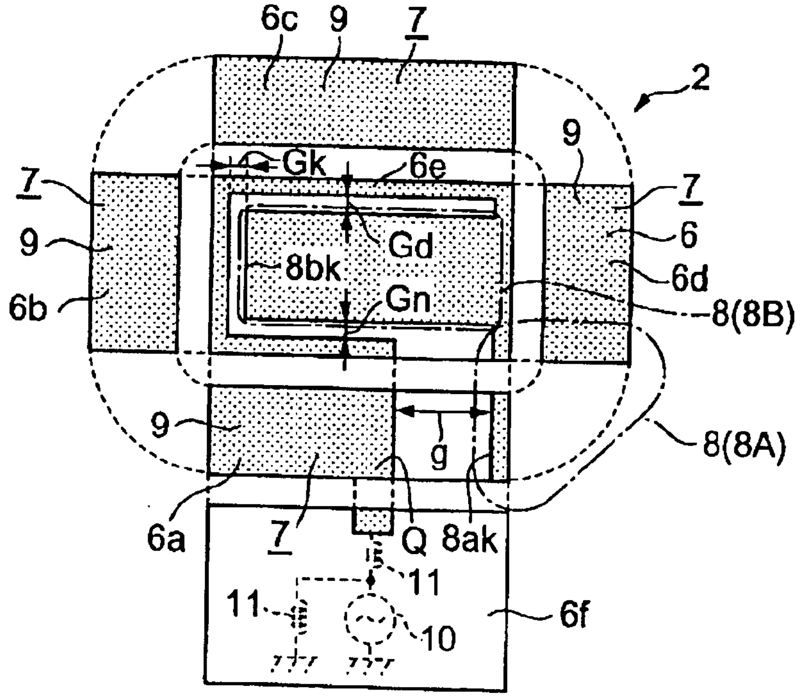

FIG. 1A is a schematic perspective view of a first preferred embodiment of a surface mount antenna and an antenna device including such an antenna. FIG. 1B is a development view of the surface mount antenna.

An antenna device 1 of the first preferred embodiment preferably includes a surface mount antenna 2 mounted on a circuit substrate 3, e.g., for use in a communication device. A ground electrode 4 is disposed on the circuit substrate 3 excluding at least the area Z in which the surface mount antenna 2 is to be mounted. Thus, the surface mount antenna 2 is surface-mounted on the non-ground area Z of the circuit substrate 3 where the ground electrode 4 is not provided.

Figure 2:
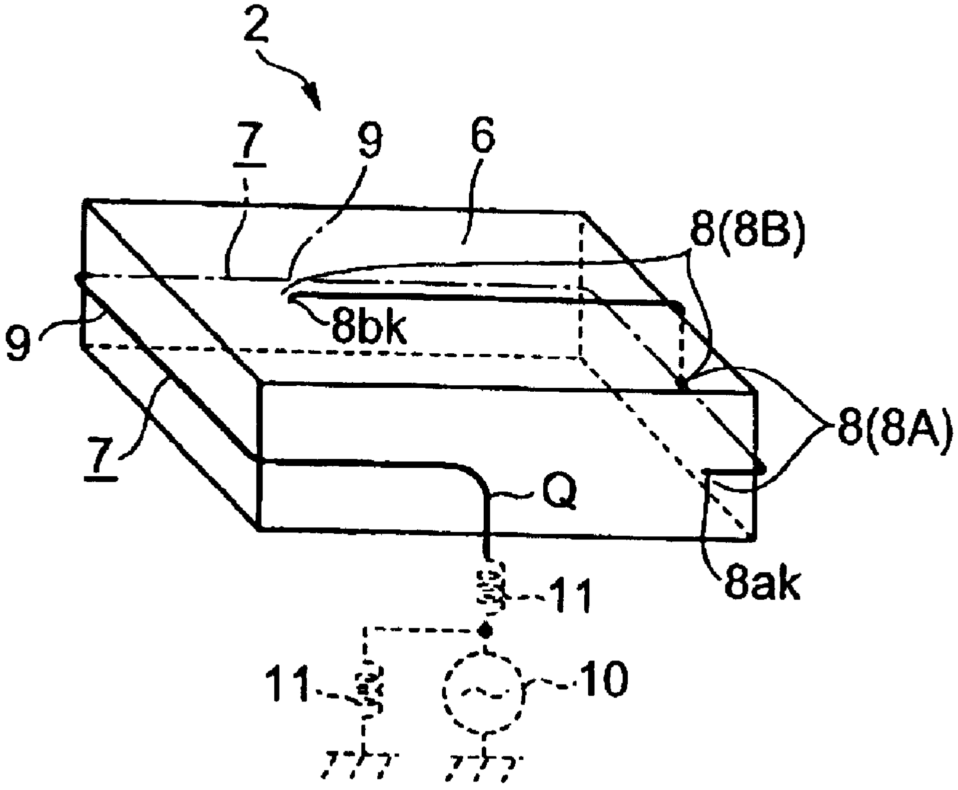
FIG. 2 shows a model of the radiation electrode of FIG. 1 in a simplified form.

The surface mount antenna 2 includes a substantially rectangular shaped dielectric substrate 6, and a radiation electrode 7 disposed on the substrate 6. Regarding the radiation electrode 7, the base-end portion thereof is disposed on a side surface 6*a* of the substrate 6. The radiation electrode 7 is arranged in a loop-pattern in which the electrode 7 is extended from the side surface 6*a* to a side surface 6*d* via a side surface 6*b* and a side surface 6*c* in that order. Moreover, the front side of the radiation electrode 7 is branched to provide a branched radiation electrode 8A and a branched radiation electrode 8B. That is, the branched radiation electrode 8*a* is arranged to be extended from the side surface 6*d* toward the side surface 6*a,* in other words, to be extended so that it is returned toward the base-end side Q. The branched radiation electrode 8B is provided on the upper surface 6*e*. In FIG. 2, the radiation electrode 7 is shown in its simplified form. In FIG. 1, a portion of the radiation electrode 7 disposed on the side surfaces 6*a* to 6*d* is arranged so as to be bent onto the upper surface 6*e* of the substrate 6. In the first preferred embodiment, the portion of the radiation electrode 7 ranging from the base-end side Q to its branched portion from which the electrode 7 is branched into the branched radiation electrodes 8A and 8B is referred to as a main radiation electrode 9. That is, the radiation electrode 7 includes the main radiation electrode 9 and the branched radiation electrodes 8A and 8B.

The base-end side Q of the radiation electrode 7 constitutes an electric feeding portion connected to an external circuit (i.e., an RF circuit as a transmission-reception circuit) disposed on the circuit substrate 3. The front ends of the respective branched radiation electrodes 8A and 8B of the radiation electrode 7 constitute open ends, respectively. The open ends 8*ak* and 8*bk* of the branched radiation electrodes 8A and 8B are disposed on different surfaces of the substrate 6. In particular, the open-end 8*ak* of the branched radiation electrode 8A is arranged on the side surface 6*a* of the substrate 6 in opposition to and spaced at an interval relative to the feeding portion Q of the radiation electrode 7. Moreover, the open end 8*bk* of the branched radiation electrode 8B is arranged on the upper surface 6*e* of the substrate 6 in opposition to and spaced at an interval relative to the portion of the radiation electrode 7 excluding the feeding portion Q.

In the first preferred embodiment, the branched radiation electrode 8B is surrounded by and spaced at an interval relative to the loop-shaped electrode portion which includes the main radiation electrode 9 (that is, the radiation electrode portion extended from the feeding portion Q of the radiation electrode 7 to the branching portion), and the branched radiation electrode 8A connected to the main radiation electrode portion 9. Thus, the branched radiation electrode 8B is an in-loop branched radiation electrode. The front side of the branched radiation electrode (in-loop branched radiation electrode) 8B is surrounded by and spaced at an interval relative to the main radiation electrode 9. Thus, a capacitance is formed between the branched radiation electrode 8B and the main radiation electrode 9 surrounding the branched radiation electrode 8B.

The interval Gk between the open end 8*bk* of the branched radiation electrode 8B and the main radiation electrode 9 opposed to the open end 8*bk* is set to be so small that the open end 8*bk* of the branched radiation electrode 8B and the main radiation electrode 9 can be electromagnetically coupled to each other. On the other hand, the interval g between the open end 8*ak* of the branched radiation electrode 8A and the feeding portion Q of the radiation electrode 7 is set to be larger than the interval Gk so that substantially, the open end 8*ak* of the branched radiation electrode 8A and the feeding portion Q of the radiation electrode 7 can not be electromagnetically-coupled to each other.

The surface mount antenna 2 including the radiation electrode 7 disposed on the substrate 6 is arranged in a set position on the circuit substrate 3. Thus, the antenna 2 is connected to an RF circuit 10 via a matching circuit such as a wiring pattern, a chip coil 11 or other element disposed on the circuit substrate 3. For example, a signal is externally supplied from the external RF circuit 10 to the feeding portion Q of the radiation electrode 7 via the matching circuit such as the chip coil 11 or other element. The signal is transmitted through the feeding portion Q and the main radiation electrode 9 to reach the branching portion. Then, the signal is divided and enters two routes, that is, one route passing through the branched radiation electrode 8A and the other route passing through the branched radiation electrode 8B. Thus, the signal is transmitted. The radiation electrode 7 is caused to resonate by the transmission of the signal, so that the antenna can be operated. Referring to a method for disposing the surface mount antenna 2 on the circuit substrate 3, various techniques are available. For example, the substrate 6 of the surface mount antenna 2 is mounted on the circuit substrate 2 by soldering, the substrate 6 is bonded to the circuit substrate 3 by an adhesive or other suitable material, and so forth. Any such techniques may be used.

The resonance in the fundamental mode of the radiation electrode 7 is carried out in the resonance state similar to that of a λ/4 monopole antenna.

The whole radiation electrode 7 including both of the branched radiation electrode 8A and the branched radiation electrode 8B has a relationship to the resonance in the fundamental mode of the radiation electrode 7. Therefore, the effective length ranging from the feeding portion Q to the open end 8*ak* of the branched radiation electrode 8A, the effective length ranging from the feeding portion a to the open end 8*bk* of the branched radiation electrode 8B, or the like is set so that the radiation electrode 7 have electrical lengths corresponding to the resonance frequency in the required fundamental mode.

Moreover, needless to say, both of the branched radiation electrode 8A and the branched radiation electrode 8B have a relationship to the resonance in a higher-order mode of the radiation electrode 7. However, of the branched radiation electrodes 8A and (B, the branched radiation electrode 8B which is electromagnetically coupled to the main radiation electrode 9 more strongly, has a greater relationship to the resonant frequency and the impedance in the higher-mode of the radiation electrode 7. The relationship of the other branched radiation electrode 8A to the resonant frequency of the higher-order mode is relatively low.

If the interval Gk and opposition area between the open end 8*bk* of the branched radiation electrode 8B, which has a larger relationship to the higher-order mode, and the main radiation electrode 9 opposed to the open end 8*bk* (in other words, a capacitance between the open end 8*bk* and the radiation electrode portion opposed to the open end 8*bk*) can be changed, the resonant frequency in the higher-order mode can be significantly changed while the change of the resonant frequency of the fundamental mode is kept as small as possible. Therefore, in this first preferred embodiment, the interval Gk and opposition area between the open end 8*bk* of the branched radiation electrode 8B and the main radiation electrode 9 are set so that the resonant frequency of the resonance in a higher-order mode of the radiation electrode 7 has a set value.

Moreover, in the first preferred embodiment, the main radiation electrode 9 is arranged along both of the side edges of the branched radiation electrode 8B adjacently to and spaced at an interval relative to the electrode 8B. The interval Gn between one side edge of the branched radiation electrode 8B and the portion of the main radiation electrode 9 adjacent to the above-described one side edge and relatively near the feeding portion Q, and also, the interval Gd between the other side edge of the branched radiation electrode 8B and the portion of the main radiation electrode 9 adjacent to the above-described other side edge and relatively far from the feeding portion Q has a large relationship to matching between the radiation electrode 7 operated in the higher-order mode and the RF circuit 10 side. That is, the matching at resonation of the radiation electrode 7 in the higher-order mode can be controlled by adjustment of the intervals Gn and Gd (i.e., by adjustment of capacitances generated in the interval Gn and that in the interval Gd) without hazardous influences being exerted over the resonance in the fundamental mode. The matching has a relationship to the band-width. Accordingly, in the first preferred embodiment, the intervals Gn and Gd are set so that matching required in the higher-order mode of the radiation electrode 7 can be realized, and moreover, the frequency band-width can be increased.

That is, by adjustment of the intervals Gk, Gn, and Gd between the branched radiation electrode (in-loop branched radiation electrode) 8B and the main radiation electrode 9, the frequency of the higher-order mode resonance and the matching can be controlled substantially independently from the fundamental mode, while substantially no hazardous influences are exerted over the resonance generated in the fundamental mode.

Figure 4A:
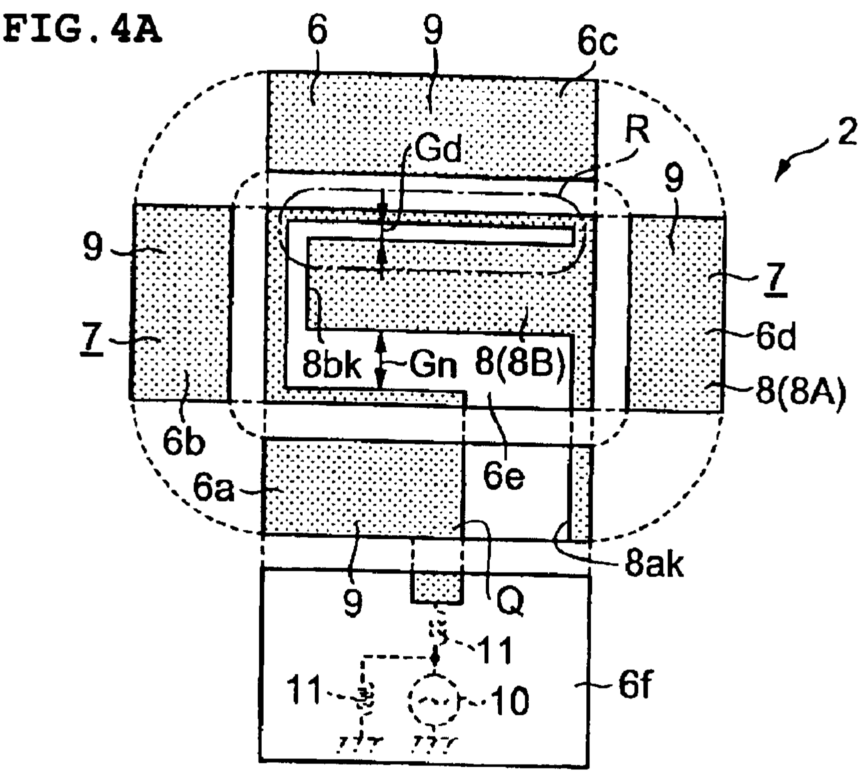
FIGS. 4A and 4B are development views of other modifications of the surface mount antenna according to the first preferred embodiment of the present invention.
Figure 4B:
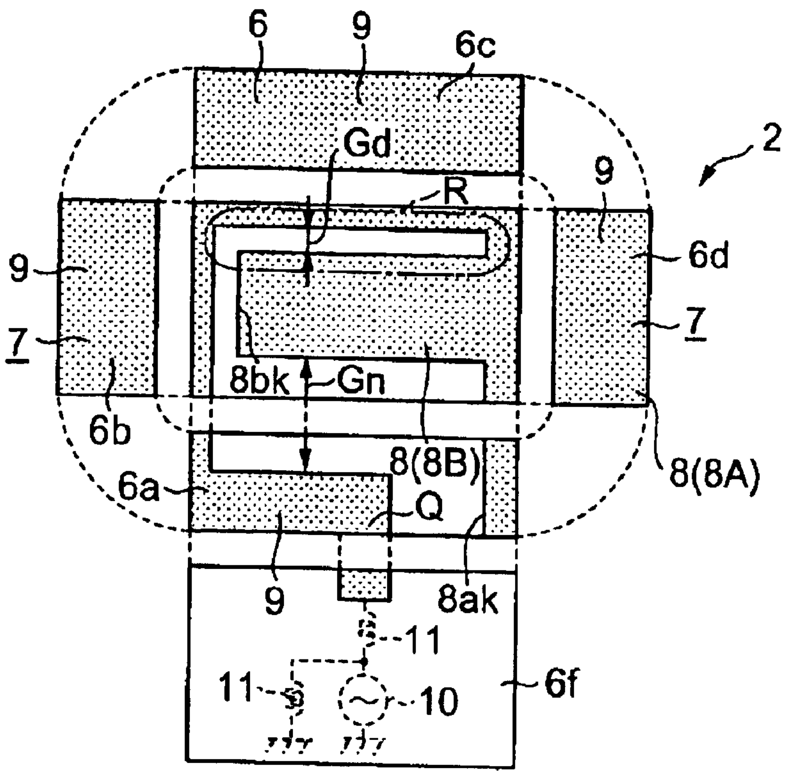

In the example of FIGS. 1A and 1B, the interval Gn is substantially equal to the interval Gd. However, these intervals Gn and Gd are not necessarily equal to each other. For example, as a result of investigation of the intervals Gn and Gd to realize the matching satisfactorily, it has been revealed that, as shown in FIGS. 4A and 4B, the interval Gn may be larger than the interval Gd in some cases. In this case, an electric field is confined in the loop of the radiation electrode 7 including the main radiation electrode 9 and the branched radiation electrode 8B, as represented by an alternate long and short dash line R in FIGS. 4A and 4B. Therefore, a problem can be avoided, in that when an object such as a human body or other element than can act as a ground, reaches the surface mount antenna 2, the electric field is attracted toward the ground object, which exerts hazardous influences over the antenna characteristic. Moreover, in some cases, the interval Gn may be smaller than the interval Gd.

For example, to improve the matching, the intervals Gn and Gd are not adjusted, but slits having substantially the same widths as the intervals Gn and Gd are provided, and the lengths Sn and Sd of the slits are adjusted to control capacitances Cn and Cd, so that the matching in the higher-order mode of the radiation electrode 7 can be improved. In the above-description, the length Sn (see FIG. 3) is that of the slit which is positioned relatively near the feeding portion Q compared to the branched radiation electrode (in-loop branched radiation electrode) 8B and is extended along the branched radiation electrode 8B. The length Sd is that of the slit which is positioned farther from the feeding portion Q than from the branched radiation electrode 8B, and is extended along the branched radiation electrode 8B. The capacitance Cn is generated between the branched radiation electrode 8B and the portion of the main radiation electrode 9 opposed to the branched radiation electrode 8B and located relatively near the feeding portion Q. The capacitance Cd is generated between the branched radiation electrode 8B and the portion of the main radiation electrode 9 opposed to the branched radiation electrode 8 and located relatively far from the feeding portion Q.

Figure 3:
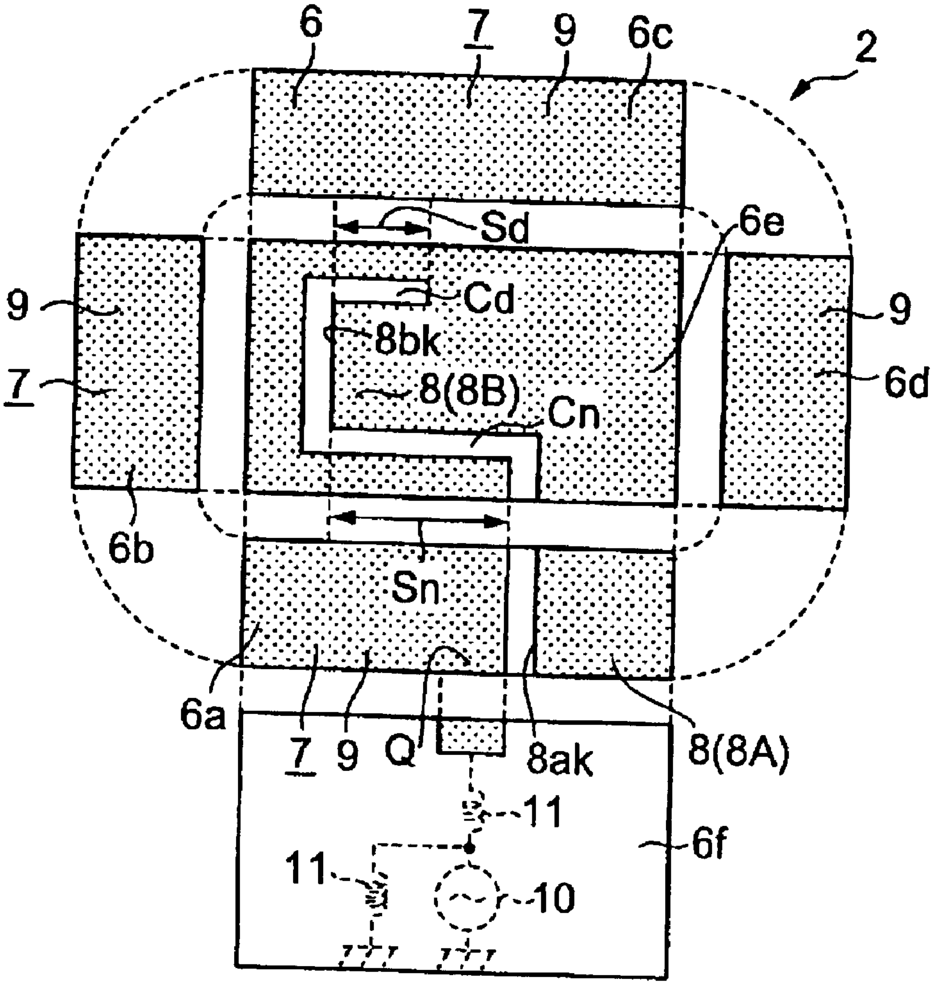
FIG. 3 is a development view of a modification of the surface mount antenna according to the first preferred embodiment of the present invention.

Moreover, in the example of FIG. 3, the slit-length Sn is preferably larger than the slit-length Sd. In this case, the capacitance Cn generated in the slit positioned nearer the feeding portion Q than the branched radiation electrode 8B is larger than the capacitance Cd generated in the slit positioned farther from the feeding portion Q than from the branched radiation electrode 8B. Thereby, the strength of an electric field between the branched radiation electrode 8B and the portion of the main radiation electrode 9 positioned relatively near the feeding portion Q is larger. Thereby, the change of the antenna-characteristic, which may occur due to a human body or other object reaching the antenna, can be reduced.

As described above, according to the first preferred embodiment, the radiation electrode 7 is divided in the branching portion thereof which exists on a path from one-side end feeding portion) Q to the other end (open end) to form the plurality of branched radiation electrodes 8A and 8B. Thus, the radiation electrode 7 has a configuration in which the open end side of the electrode 7 is branched and separated. A highest electric field is ready to be generated between the open end of the radiation electrode 7 and the ground in the radiation electrode 7. The electric field between the open end 7 and the ground has a relationship to the reduction of the antenna efficiency and bandwidth of the surface mount antenna 2. However, in the first preferred embodiment, the open end side of the radiation electrode 7 is preferably branched into the two branched radiation electrodes 8A and 8B. Therefore, the branched radiation electrode 8B, one of the branched radiation electrodes, can be positioned farther from the ground than from the branched radiation electrode 8A, the other of the branched radiation electrodes. Thus, the strength of an electric field generated between the open end of the radiation electrode 7 and the ground can be reduced. Accordingly, the antenna efficiency and bandwidth of the surface mount antenna 2 can be improved.

Moreover, in the first preferred embodiment, one of the branched radiation electrodes constitutes the in-loop branched radiation electrode 8B. The front end portion of the in-loop branched radiation electrode 8B is surrounded by the main radiation electrode 9 with an interval being provided between the front end portion and the main radiation electrode 9 so that a capacitance can be formed. The capacitance can be applied to the radiation electrode 7 so that the inductance (electrical length) of the radiation electrode 7 is increased. Accordingly, the resonant frequency of the radiation electrode 7 of the first preferred embodiment can be reduced compared to that of a radiation electrode having a linear shape on the condition that the effective lengths of the radiation electrodes are substantially equal to each other. One of the reasons lies in that the inductance of the radiation electrode 7 is increased correspondingly to the inductance generated by the above-mentioned capacitance. In other words, when equal resonant frequencies are required, the effective length of the radiation electrode 7 of the first preferred embodiment can be set shorter than that of the linear radiation electrode, for example. Accordingly, the size of the substrate 6 (that is, the surface mount antenna 2) can be easily reduced.

Moreover, in the first preferred embodiment, the radiation electrode 7 has a loop-shape, the radiation electrode 7 is branched in the branching portion positioned on the path from the feeding portion Q of the radiation electrode 7 to the other end side, so that the branched radiation electrodes 8A and 8B are provided, and the electromagnetic coupling between the open end of the branched radiation electrode 8B and the main radiation electrode 9 is stronger than that between the open end of the branched radiation electrode 8A and the main radiation electrode. According to this configuration, both of the branched radiation electrodes 8A and 8B have a relationship to the resonance generated in the fundamental mode. However, the branched radiation electrode 8B has a greater relationship to the resonance made in the higher-order mode, while the branched radiation electrode 8A has substantially no relationship to the resonance. Thus, advantageously, the branched radiation electrode 8B can be used as an electrode for controlling the resonance in the higher-order mode, and thereby, the control of the resonant frequency, matching, and so forth in the fundamental mode, and the control of the resonant frequency, matching, and so forth in the higher-order mode can be carried out substantially independently from each other.

Figure 5A:
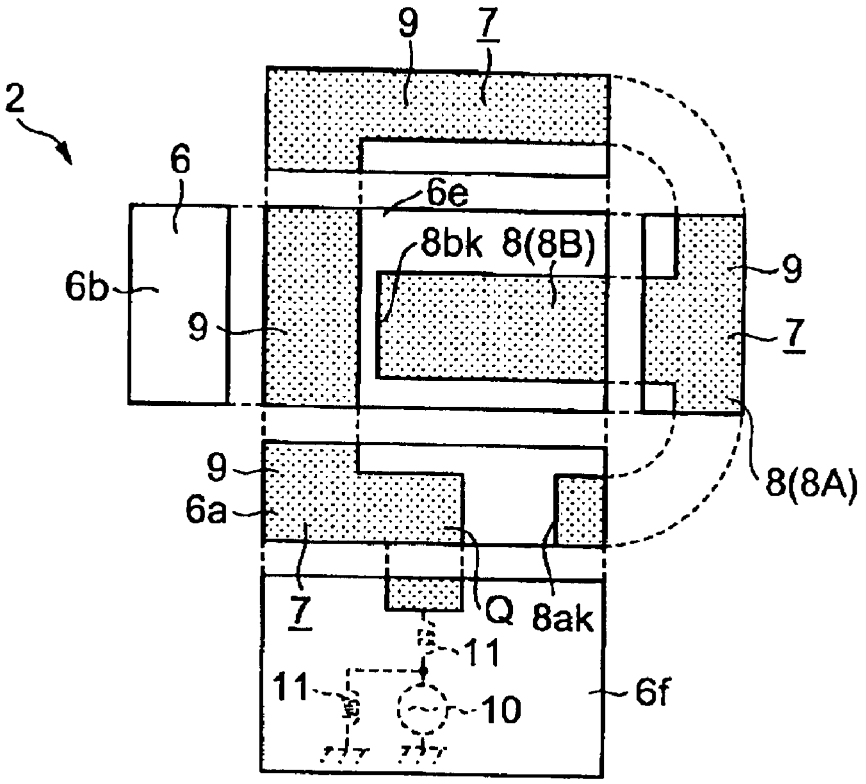
FIGS. 5A and 5B are development views of still other modifications of the surface mount antenna according to the first preferred embodiment of the present invention.
Figure 5B:
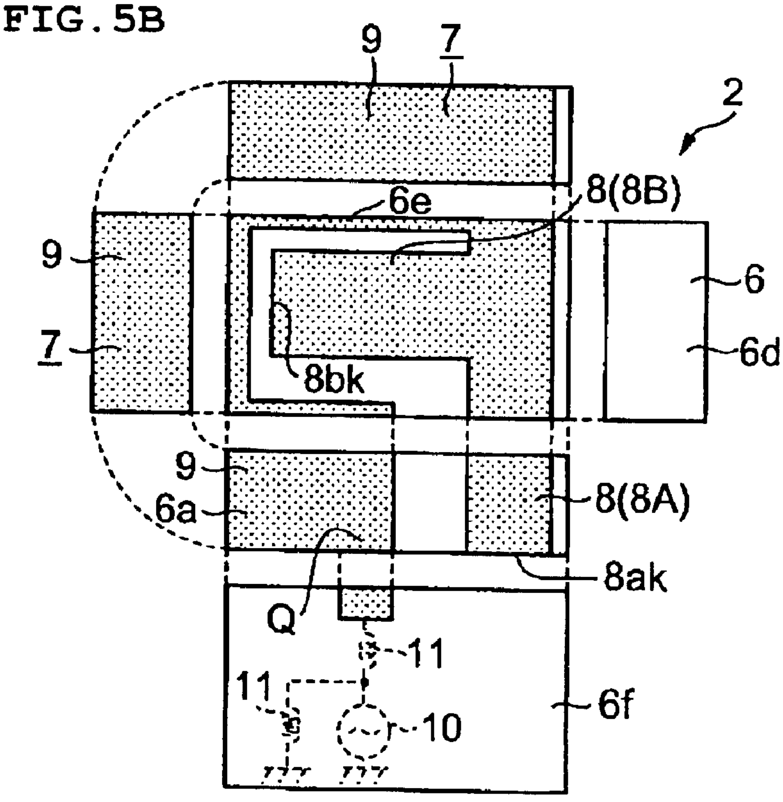

According to the first preferred embodiment, the main radiation electrode 9 partially constituting the radiation electrode 7 is arranged so as to be continuously extended on all of the four side surfaces 6*a* to 6*d* of the substrate 6. However, the main radiation electrode 9 is not necessarily provided on all of the four side surfaces 6*a* to 6*d* of the substrate 6. For example, as shown in the development views of the surface mount antenna 2 shown in FIGS. 5A and 5B, the main radiation electrode 9 may be disposed on at least one of the four side surfaces 6*a* to 6*d* of the substrate.

Figure 14:
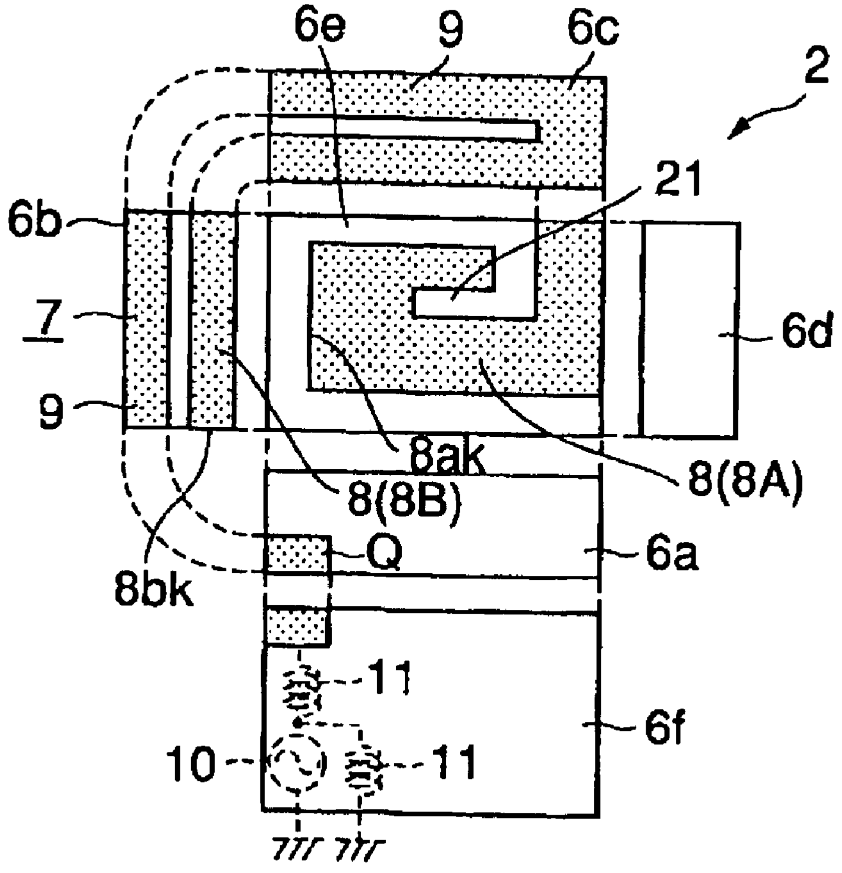
FIG. 14 is a development view of an example of a surface mount antenna having a cut-in formed in the branched radiation electrode.
Figure 15:
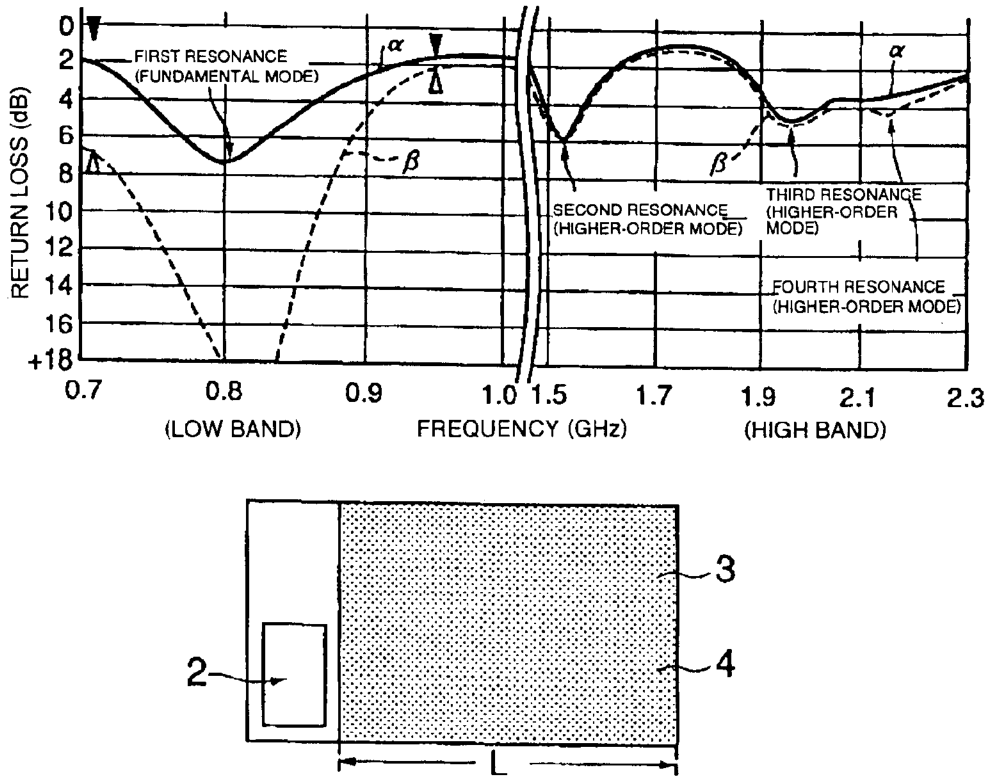
FIG. 15 is a graph showing an example of the impedance characteristic of a surface mount antenna.

Moreover, a cut-in 21 may be formed in the branched radiation electrode 8A as shown in FIG. 14. In this case, the third resonance and the fourth resonance (higher-order modes), as shown in the graph of the impedance characteristic of FIG. 15A, can be controlled so that the two resonance states are positioned to be adjacent to each other in the graph. The graph of FIG. 15A is obtained by an experiment in which the surface mount antenna 2 (having approximate dimensions of: width of 8 mm, length of 23 mm, and thickness of 6 mm) is mounted on the substrate 3 shown in FIG. 15B. Solid line a in FIG. 15A represents the impedance characteristic obtained when the length L of the ground electrode 4 on the substrate 3 shown in FIG. 15B is about 90 mm. Dotted line β represents the impedance characteristic obtained when the length L of the ground electrode 4 on the substrate 3 is about 180 mm. The surface mount antenna 2 shown in FIG. 14 can be constructed so that the first resonance (fundamental mode) occurs in a low band as shown in FIG. 15A, and also so that the second to fourth resonances (higher-order modes) occur in high bands. According to the experiment made by the inventors of the present invention, it has been identified that the second to fourth resonances (higher-order modes) can be controlled by the in-loop branched radiation electrode 8B and the cut-in 21 mainly formed in the branched radiation electrode 8A, respectively.

Hereinafter, a second preferred embodiment will be described. In the description of the second preferred embodiment, the same components as those of the first preferred embodiment are designated by the same reference numerals, and the description is not repeated.

Figure 6A:
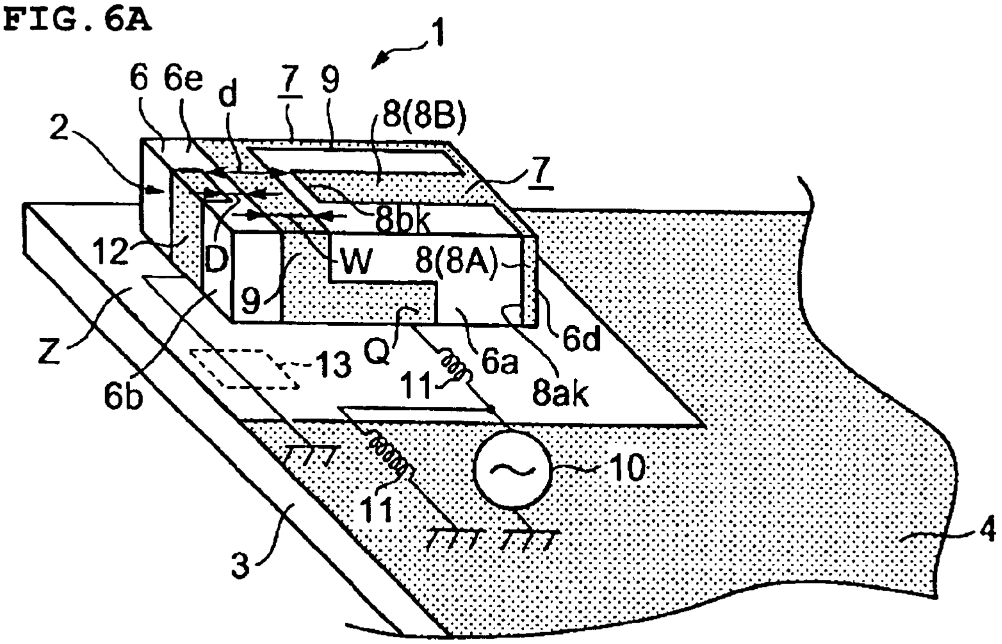
FIGS. 6A and 6B illustrate a surface mount antenna according to a second preferred embodiment of the present invention, and an antenna device including the same.
Figure 6B:
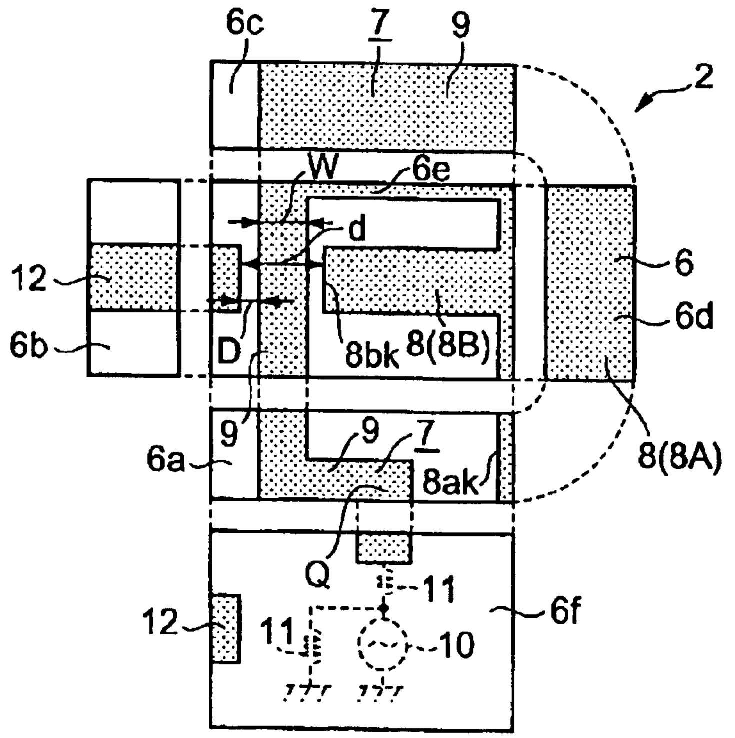
Figure 7A:
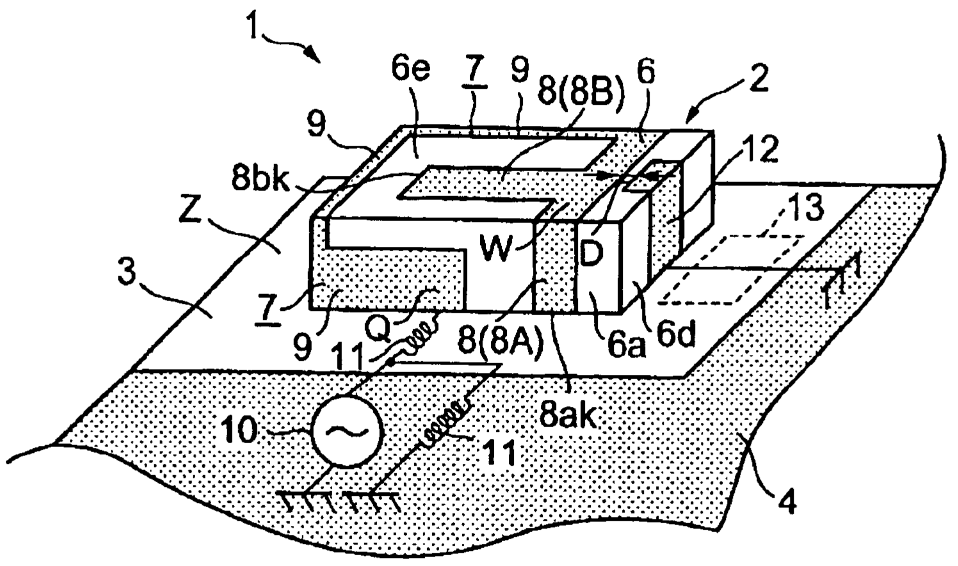
FIGS. 7A and 7B illustrate a surface mount antenna according to the second preferred embodiment of the present invention, and an antenna device including the same, similarly to FIGS. 6A and 6B.
Figure 7B:
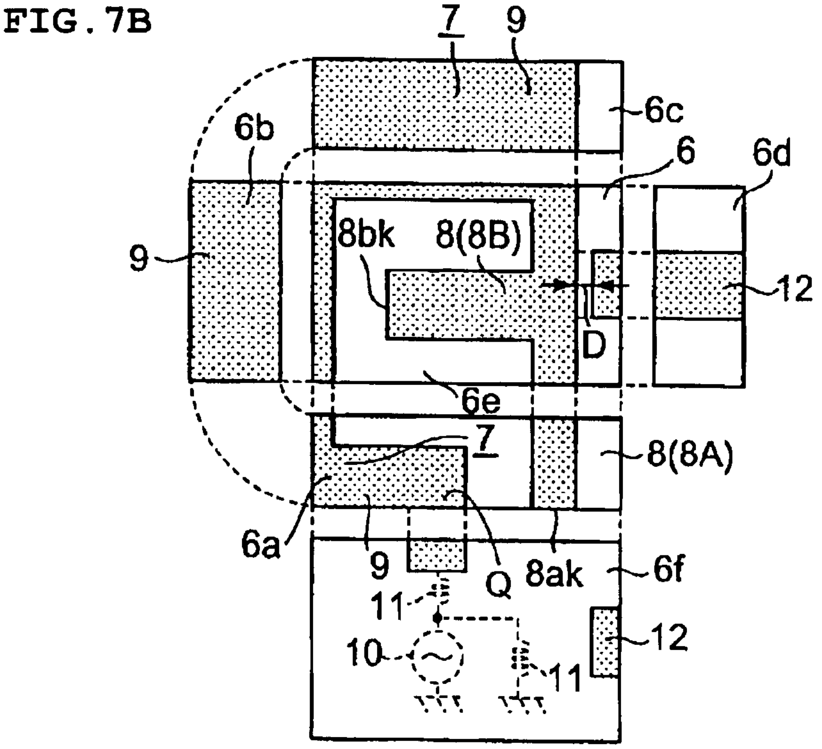

In the preferred second embodiment, a no-feeding radiation electrode 12, in addition to the looped radiation electrode 7, is provided on the substrate 6 of the surface mount antenna 2 with an interval being provided between the electrodes 7 and 12, as shown in FIGS. 6A, 6B, 7A, and 7B. The constitution of the second preferred embodiment is preferably the same as that of the first preferred embodiment except for the non-feeding radiation electrode 12. FIG. 6A and FIG. 7A are schematic perspective views of antenna devices, respectively. FIG. 6B is a development view of the surface mount antenna 2 shown in FIG. 6A. FIG. 7B is a development view of the surface mount antenna 2 shown in FIG. 7A.

The non-feeding radiation electrode 12 can be electromagnetically coupled to the radiation electrode 7 to generate a double resonance state together with the radiation electrode 7 in a higher-order mode. Thus, e.g., the bandwidth in the higher-order mode can be increased. The electromagnetic coupling of the non-feeding radiation electrode 12 to the radiation electrode 7 has a relationship to the double resonance state of the non-feeding radiation electrode 12 and the radiation electrode 7. The distance D between the non-feeding radiation electrode 12 and the radiation electrode 7 has a relationship to the above-mentioned electromagnetic coupling. In the second preferred embodiment, the interval between the non-feeding radiation electrode 12 and the radiation electrode 7 and so forth are set so that the non-feeding radiation electrode 12 and the radiation electrode 7 can have a required double resonance state.

As shown in FIGS. 6A and 6B, the open end **8*bk* of the branched radiation electrode 8*b* and the front end of the non-feeding radiation electrode 12 are arranged in such a manner that the main radiation electrode 9 partially constituting the radiation electrode 7 is interposed between the open end 8*bk* and the front end of the electrodes 12. In this case, not only the interval D between the front end of the non-feeding radiation electrode 12 and the main radiation electrode 9 but also an interval d between the front end of the non-feeding radiation electrode 12 and the open end 8*bk* of the branched radiation electrode 8B, and also, the width W of the portion of the main radiation electrode 9 existing between the front end of the non-feeding radiation electrode 12 and the open end 8*bk* of the branched radiation electrode 8B have a relationship to the electromagnetic coupling (i.e., double resonance) of the non-feeding radiation electrode 12 to the radiation electrode 7. Therefore, in this case, not only the interval D but also the interval d and the width W of the main radiation electrode 9 are set so that the non-feeding radiation electrode 12 and the radiation electrode 7** can have their satisfactory double resonance state.

In the antenna device 1 of the second preferred embodiment, the non-feeding radiation electrode 12 of the surface mount antenna 2 is connected to the ground electrode 4 on the circuit substrate 3 as shown in FIGS. 6A and 7A. Regarding the surface mount antenna 2, it has been required that the size is reduced. Also, the size-reduction of the substrate 6 has been required to satisfy the requirement. Thus, when not only the loop-shaped radiation electrode 7 but also the non-feeding radiation electrode 12 is formed on the small-sized substrate 6, inevitably, the area where the non-feeding radiation electrode 12 is located must be set to be narrow. Therefore, in some cases, the electrical length of the non-feeding radiation electrode 12 becomes shorter than a required one. For such cases, the non-feeding radiation electrode 12 is not directly connected to the ground electrode 4, but a circuit 13 having an inductance is incorporated in the connection route extended between the non-feeding radiation electrode 12 and the ground electrode 4. The circuit 13 can apply an inductance to the non-feeding radiation electrode 12. Thus, in appearance, the electrical length of the non-feeding radiation electrode 12 becomes larger than that of the actual non-feeding radiation electrode 12. Accordingly, the circuit 13 is formed so as to have an inductance which can compensate for the shortness of the electrical length of the non-feeding radiation electrode 12. Thus, the electrical length of the non-feeding radiation electrode 12 has a set value in appearance, which enables a satisfactory double resonance state to be generated between the radiation electrode 7 and the non-feeding radiation electrode 12.

The circuit 13 may include an inductor series-connected in the connection route between the non-feeding radiation electrode 12 and the ground electrode 4. Also, the circuit 13 may have a parallel circuit including an inductor and a capacitor for reduction of the bandwidth in the fundamental mode.

According to the second preferred embodiment, the non-feeding radiation electrode 12 is provided in addition to the loop-shaped radiation electrode 7. The bandwidth in the higher-order mode can be increased due to the double resonance of the radiation electrode 7 and the non-feeding radiation electrode 12.

Figure 8:
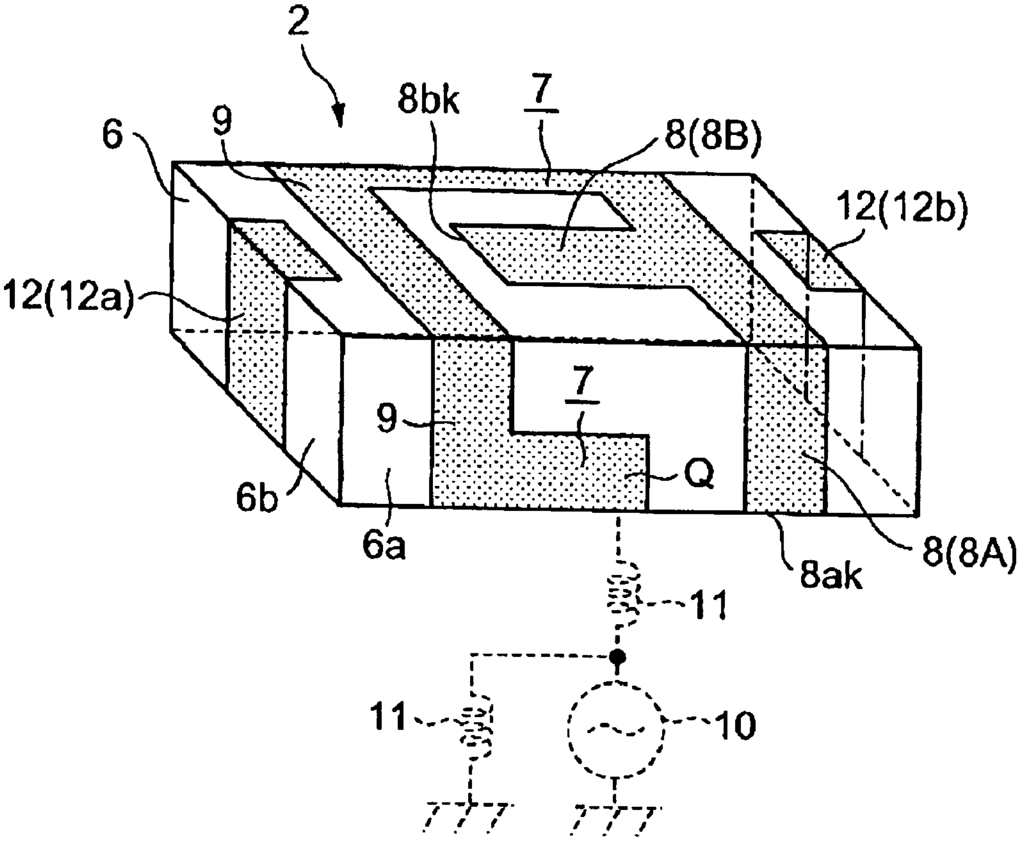
FIG. 8 shows a model of a surface mount antenna according to the second preferred embodiment in which a plurality of non-feeding radiation electrodes are provided.

In the examples of FIGS. 6A, **6*b*, 7A, and 7B, one non-feeding radiation electrode 12 is preferably provided. However, for example, a plurality of non-feeding radiation electrodes 12*a* and 12*b* may be provided as shown in FIG. 8. In this case, the bandwidths of both of the fundamental mode and a higher-order mode can be easily increased by appropriately setting the arrangement and the electrical lengths of the non-feeding radiation electrodes 12*a* and 12*b* so that one of the non-feeding radiation electrodes 12 can function as a non-feeding radiation electrode for the double resonance in the fundamental mode, and the other can function as a non-feeding radiation electrode for the double resonance in the higher-order mode. Moreover, all of the plurality of non-feeding radiation electrodes 12** may be caused to function as non-feeding radiation electrodes for the double resonance in one of the fundamental mode and the higher-order mode.

Hereinafter, a third preferred embodiment will be described. In the description of the third preferred embodiment, the same components as those in the first and second preferred embodiments are designated by the same reference numerals, and the description is not repeated.

Figure 9:
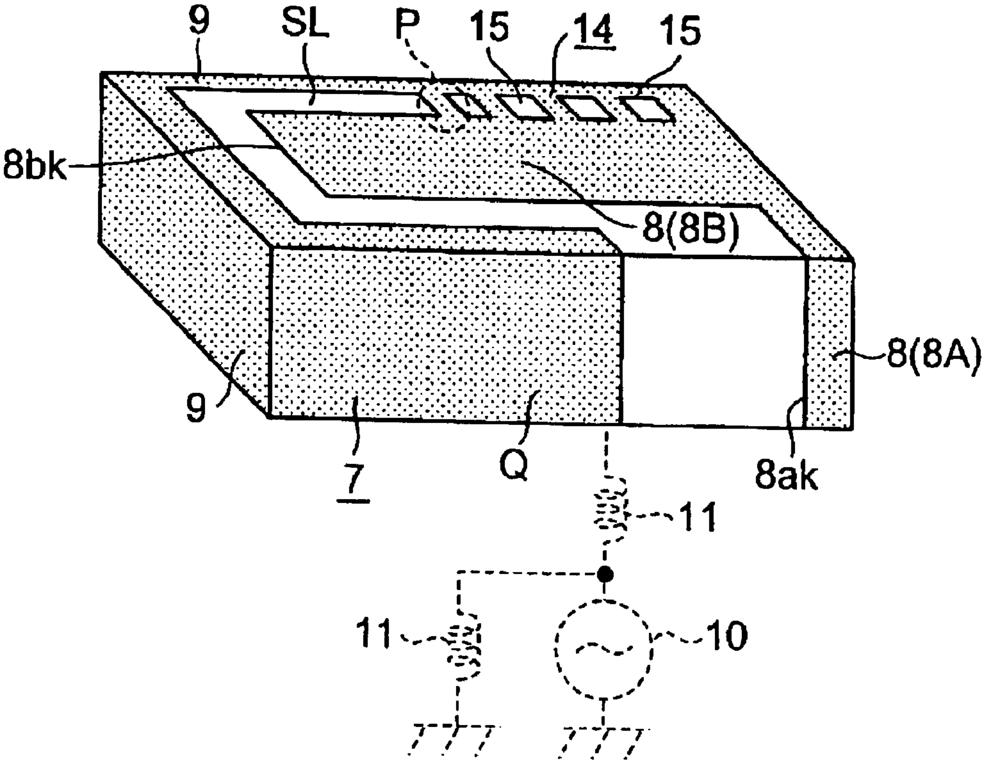
FIG. 9 illustrates a third preferred embodiment of the present invention.

In the third preferred embodiment, characteristically, frequency-adjusting portions 14 are formed in the loop-shaped radiation electrode 7 as shown in FIG. 9. The constitution of the third preferred embodiment is the same as that of each of the first and second preferred embodiments except for the frequency-adjusting portions 14.

The frequency-adjusting portions 14 can variably change the length of the portion of the slit SL existing between the side edge relatively far from the feeding portion Q of the branched radiation electrode 8B and the portion of the main radiation electrode 9 adjacent to the above-mentioned portion of the electrode 8B, so that the capacitance generated between the electrodes 8B and 9 existing on both sides of the slit SL is adjusted. Thereby, the resonant frequency of the radiation electrode 7 can be adjusted.

According to the third preferred embodiment, a plurality of electrode-removed portions 15 are arranged at an interval along the prolonged line of the slit SL to define the frequency-adjusting portions 14. The frequency-adjusting portions 14 are effective in increasing the length of the slit SL. That is, the electrode portion between the slit SL and the adjacent electrode portion and also the electrode portions (enclosed by dotted line P in FIG. 9) between the electrode-removed portions 15 may be cut away, e.g., by trimming or other suitable process so that the length of the slit SL is increased. Thus, the resonant frequency can be variably adjusted.

According to the third preferred embodiment, the portions for adjusting the resonant frequency of the radiation electrode 7 are provided as described above. Thus, a surface mount antenna 2 having an accurate resonant frequency as set in advance and an antenna device 1 including such a surface-mount antenna can be provided.

Moreover, according to the third preferred embodiment, the frequency-adjusting portions 14 can be applied for variable adjustment of the length of slit SL, and thereby, the frequency of the radiation electrode 7 can be variably adjusted. In this case, for example, the configuration shown in FIG. 10 may be used. In the example illustrated in FIG. 10, a plurality of protuberances 16 are provided along one side-edge of the branched radiation electrode 8B. These protuberances constitute the frequency-adjusting portions 14. In the frequency-adjusting portions 14 of the example of FIG. 10, at least one protuberance 16 is removed by trimming or other suitable process, so that the capacitance between the electrodes 8B and 9 on both of the sides of the slit SL is variably changed. Thus, the resonant frequency of the radiation electrode 7 can be variably adjusted, e.g., by trimming or other suitable process.

Figure 10:
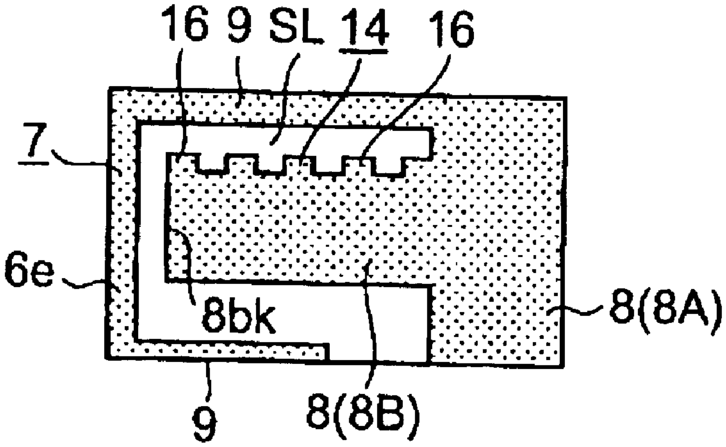
FIG. 10 illustrates a modification of the third preferred embodiment of the present invention.

In the examples shown in FIGS. 9 and 10, only the loop-shaped radiation electrode 7 is provided on the substrate 6. Needless to say, the frequency-adjusting portions 14 may be provided in the case in which the non-feeding radiation electrode 12 is provided.

Hereinafter, a fourth preferred embodiment will be described. The fourth preferred embodiment relates to a communication device. Characteristically, the communication device is provided with one of the antenna device 1 and the surface mount antenna 2 described in the first to third preferred embodiments. The constitution of the communication device excluding the antenna device 1 or the surface mount antenna 2 has no particular limitation. The communication device may be appropriately configured so as to meet various requirements, the description of which is not included in this specification. The antenna device 1 and the surface mount antenna 2 are described above, and thus, the repeated description is omitted.

The communication device is provided with one of the antenna device 1 and the surface mount antenna 2 described in the first to third preferred embodiments. Therefore, the size of the communication device can be reduced, due to the small size of the antenna device 1 or the surface mount antenna 2. In addition, the reliability of radio communication carried out with the communication device can be enhanced.

Figure 11A:
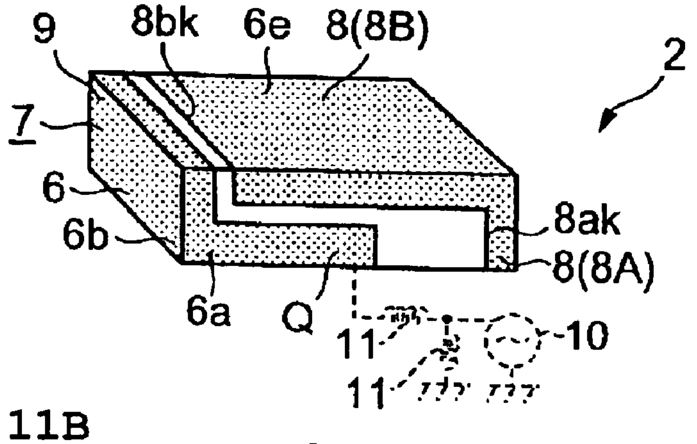
FIG. 11A shows a model of a surface mount antenna according to another preferred embodiment of the present invention.
Figure 11B:
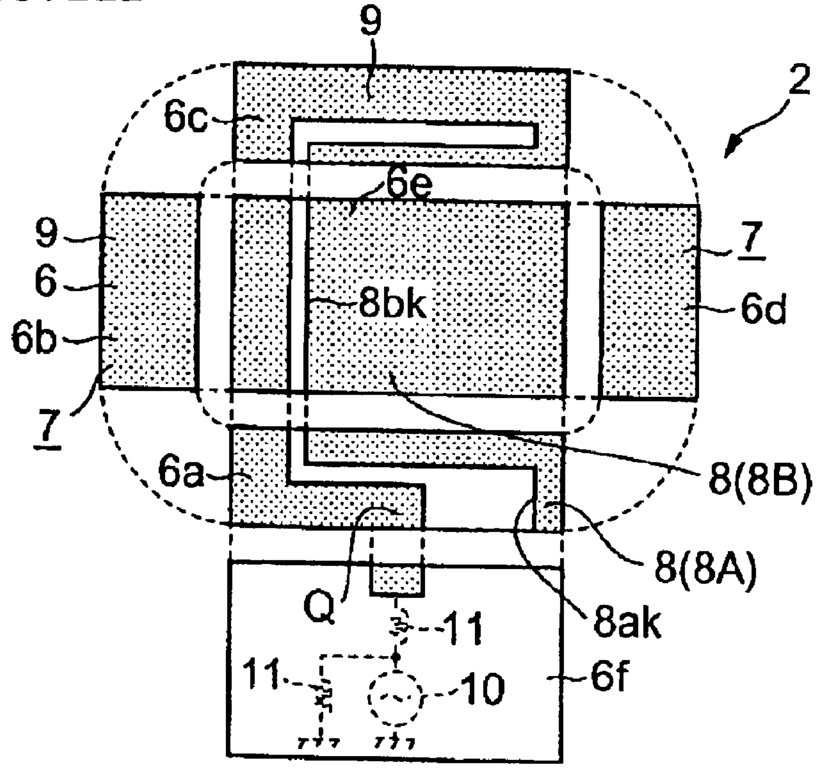
FIG. 11B is a development view of the surface mount antenna according to a preferred embodiment of the present invention.

The present invention is not restricted to the first to fourth preferred embodiments described above. Various forms can be adopted. For example, in the first to fourth preferred embodiments, the branched radiation electrode 8B partially constituting the radiation electrode 7 is provided only on the upper surface 6*e* of the substrate 6. However, for example, the branched radiation electrode 8B may be arranged so as to be extended over several surfaces of the substrate 6 as shown in FIGS. 11A and 11B. Thus, the electrode 8B may be a branched radiation electrode having a larger width than the portion of the branched radiation electrode 8 excluding the electrode 8B.

Figure 12:
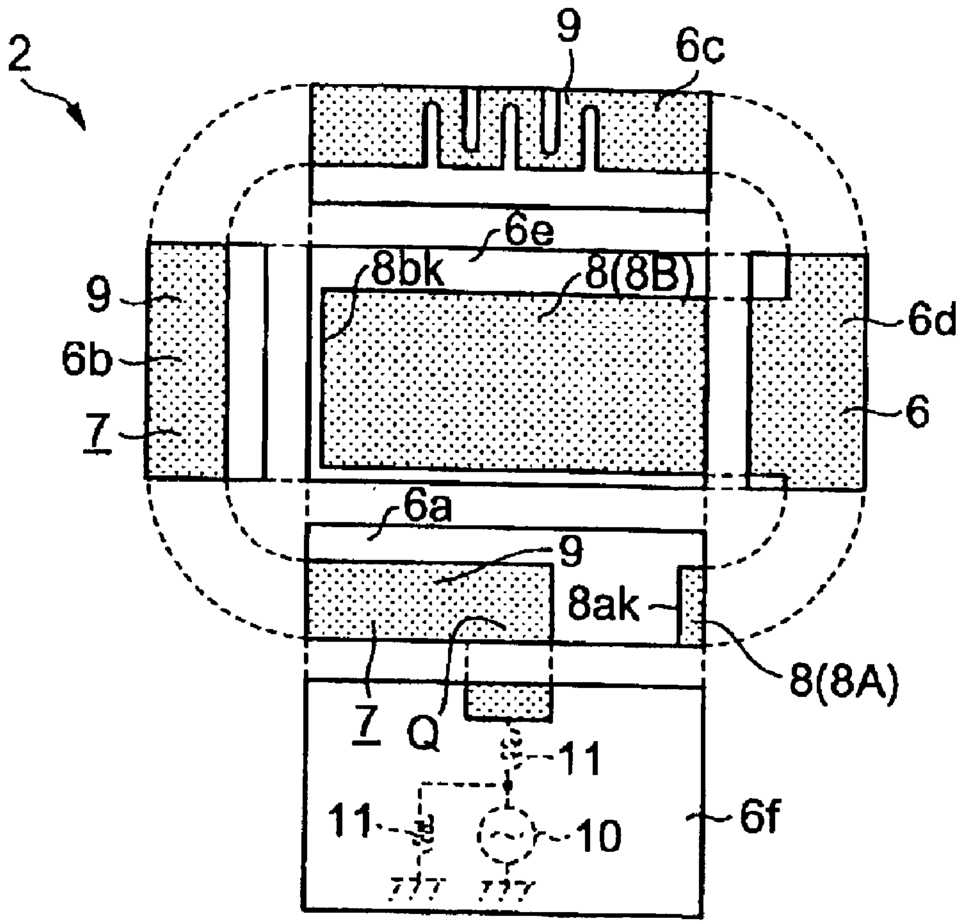
FIG. 12 is a development view of a surface mount antenna according to still another preferred embodiment of the present invention.

Moreover, as shown in FIG. 12, a portion of the radiation electrode 7 may have a meandering shape. In this case, the electrical length of the radiation electrode 7 can be increased. Thus, the further size-reduction can be realized. Especially, if the meandering-shaped portion is provided in an area of the radiation electrode 7 where the current distribution is largest, the effect of the meandering-shaped portion on increasing the electrical length of the radiation electrode 7 can be enhanced. Thus, an even greater reduction of the size can be achieved.

Moreover, in the first to fourth preferred embodiments, the interval g between the open end 8*ak* of the branched radiation electrode 8A and the feeding portion Q is preferably larger than the interval Gk between the open end 8*bk* of the branched radiation electrode 8B and the main radiation electrode 9. However, as shown in FIG. 3, the interval g may be set to be substantially equal to the interval Gk. In this case, it is preferable, e.g., to increase the length of the branched radiation electrode 8B over which the electrode 8B is surrounded by the main radiation electrode 9, so that the electromagnetic coupling between the branched radiation electrode 8B and the main radiation electrode 9 is significantly stronger than that between the open end 8*ak* of the branched radiation electrode 8A and the feeding portion Q. Also, in this case, the antenna-operation can be carried out as well as in the first to fourth preferred embodiments. The same advantages as those of the respective first to fourth preferred embodiments can be obtained.

Figure 13:
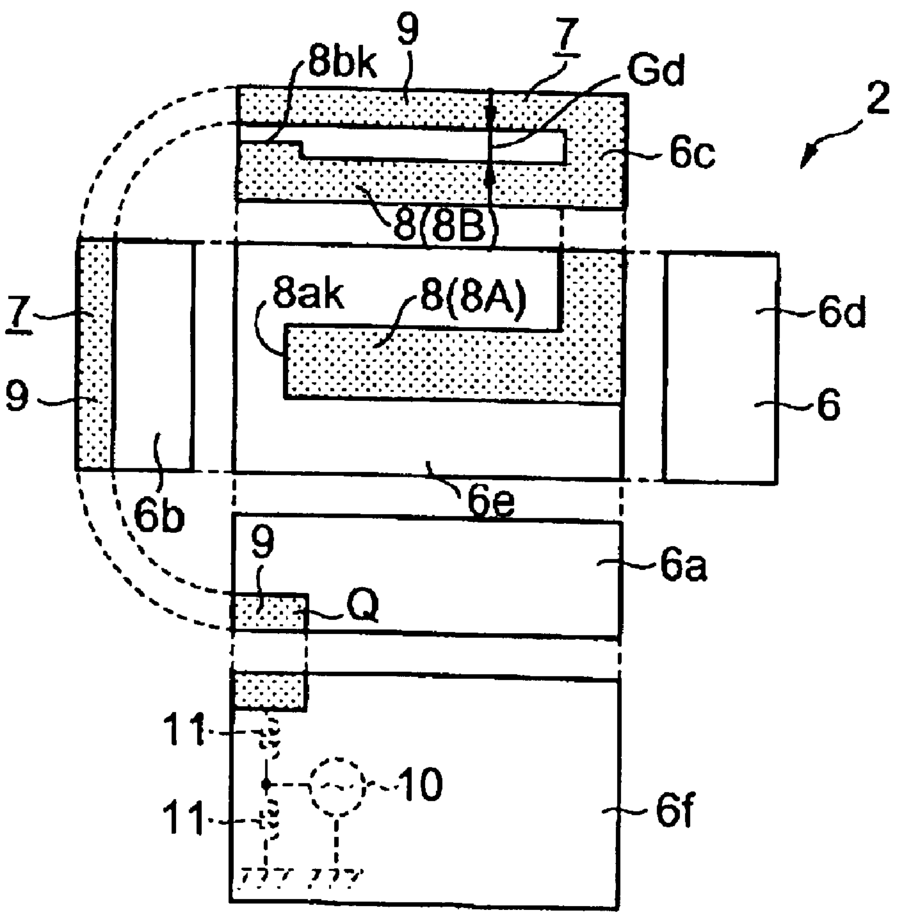
FIG. 13 is a development view of a surface mount antenna according to yet another preferred embodiment of the present invention.

Furthermore, in the first to fourth preferred embodiments, regarding one, i.e., the electrode 8A, of the branched radiation electrodes 8A and 8B partially constituting the radiation electrode 7, the open end 8*ak* is provided on the same surface 6*a* of the substrate 6 as the feeding portion Q of the radiation electrode 7 so as to be opposed to and at an interval of the feeding portion Q. However, as shown in FIG. 13, regarding one of both of the branched radiation electrodes 8A and 8B, the open ends may be arranged, not opposed to the feeding portion Q of the radiation electrode 7.

Moreover, regarding the in-loop branched radiation electrode 8B partially constituting the radiation electrode 7, the front end side thereof is surrounded by the main radiation electrode 9. However, as shown in FIG. 13, one-side edge of the in-loop branched radiation electrode 8B is adjacent to the main radiation electrode 9 at an interval Gd. The opposite-side edge of the in-loop branched radiation electrode 8B is adjacent to the branched radiation electrode 8A at an interval thereto. Thus, the in-loop branched radiation electrode 8B may be formed so as to be surrounded by a loop-shaped electrode including the main radiation electrode 0 and the branched radiation electrode 9A. In the example of FIG. 13, the resonant frequency of the higher-order mode can be controlled by the interval between the open end of 8*bk* of the branched radiation electrode 8B and the main radiation electrode opposed to the open end 8*bk*. Moreover, matching of the higher-order mode can be controlled by the interval Gd between the side-edge of the branched radiation electrode 8B and the main radiation electrode 9. The surface mount antenna 2 shown in FIG. 13 has the same sufficient advantages as those of the respective surface mount antennas 2 of the first to fourth preferred embodiments.

Moreover, as shown in FIG. 14, the second, the third, and the fourth resonances in the higher-order mode (see FIG.

15A) can be more easily controlled by forming a cut-in 21 in the branched radiation electrode 8A having a large width.

Furthermore, in the first to fourth preferred embodiments, two branched radiation electrodes, that is, the branched radiation electrodes 8A and 8B are formed in the radiation electrode 7. However, at least three branched radiation electrodes may be formed.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A surface mount antenna comprising a dielectric substrate and a radiation electrode operative to perform an antenna-operation and arranged in a loop-shape so as to be extended over a plurality of surfaces of the dielectric substrate;

the radiation electrode including an electric feeding portion disposed on one side thereof and connected to an external circuit, the radiation electrode being branched in a branching portion existing along a path from the electric feeding portion to the other end to define a plurality of branched radiation electrodes;

one of the branched radiation electrodes being an in-loop branched radiation electrode which is surrounded by a loop-shaped electrode including the radiation electrode portion extended from the electric feeding portion to the branching portion and another branched radiation electrode connected to the radiation electrode portion, the in-loop branched radiation electrode being spaced at an interval from the loop-shaped electrode portion;

the in-loop branched radiation electrode and the radiation electrode portion extended from the electric feeding portion to the branching portion defining a capacitance therebetween; and at least front ends of the respective branched radiation electrodes being arranged on different surfaces of the dielectric substrate.

2. A surface mount antenna according to claim 1, wherein at least a front end of the in-loop branched radiation electrode is surrounded by the radiation electrode portion extended from the electric feeding portion to the branching portion, and an interval between the side edge of the at least front end portion of the in-loop branched radiation electrode and the portion of the radiation electrode adjacent to the side edge and located relatively near the feeding portion is larger than the interval between the other side edge of the at least front end portion of the in-loop branched radiation electrode and the portion of the radiation electrode adjacent to the other side edge and located relatively far from the feeding portion.

3. A surface mount antenna according to claim 1, wherein at least a front end portion of the in-loop branched radiation electrode is surrounded by the radiation electrode portion extended from the feeding portion of the radiation electrode to the branching portion via a slit having a substantially constant width, the portion of the slit existing nearer the feeding portion than the in-loop branched radiation electrode and extended along the in-loop branched radiation electrode has a larger length than the other portion of the slit positioned farther from the feeding portion than the in-loop branched radiation electrode and extended along the in-loop branched radiation electrode.

4. A surface mount antenna according to claim 1, wherein, of the plurality of branched radiation electrodes partially constituting the radiation electrode, a front end of one branched radiation electrode is arranged on the same surface of the dielectric substrate as the electric feeding portion of the radiation electrode in opposition to the electric feeding portion and at an interval relative to the electric feeding portion, the front end of the in-loop branched radiation electrode is arranged on the same surface of the substrate as the portion of the radiation electrode excluding the electric feeding portion, in opposition to and at an interval relative to a portion of the radiation electrode excluding the feeding portion, and an interval between the feeding portion and a front end of the branched radiation electrode opposed to the feeding portion is larger than that between the portion of the radiation electrode excluding the feeding portion and the front end of the in-loop branched radiation electrode opposed to the portion of the radiation electrode excluding the feeding portion.

5. A surface mount antenna according to claim 1, wherein the in-loop branched radiation electrode is disposed on the upper surface of the dielectric substrate, and one of the other branched radiation electrodes is disposed on a side surface of the dielectric substrate.

6. A surface mount antenna according to claim 1, wherein the in-loop branched radiation electrode has a larger width than any one of the other branched radiation electrodes.

7. A surface mount antenna according to claim 1, wherein at least one non-feeding radiation electrode, in addition to the loop-shaped radiation electrode, is disposed on the dielectric substrate, and is arranged at an interval relative to the loop-shaped radiation electrode and is electromagnetically coupled to the loop-shaped radiation electrode, whereby the non-feeding radiation electrode together with the loop-shaped radiation electrode in a higher-order mode generates a double resonance state.

8. A surface mount antenna according to claim 1, wherein at least one side portion of the in-loop branched radiation electrode is arranged adjacent to the radiation electrode portion extended from the feeding portion to the branching portion via a slit, and frequency adjusting portions are provided in an electrode portion existing in the vicinity to the slit, and are arranged to variably change at least one of the width and the length of the slit for adjustment of the resonant frequency of the radiation electrode.

9. A surface mount antenna according to claim 1, wherein one of the branched radiation electrodes partially constituting the radiation electrode is provided with cut-ins for controlling the resonant frequency in a higher-order mode of the radiation electrode.

10. A surface mount antenna according to claim 1, wherein matching of the antenna is adjusted by setting of the interval between the in-loop branched radiation electrode and the loop-shaped electrode including the another branched radiation electrode or by setting of the interval between the in-loop branched radiation electrode and the radiation electrode portion extended from the feeding portion of the radiation electrode to the branching portion.

11. A surface mount antenna according to claim 1, wherein the resonant frequency in a higher-order mode is adjusted by setting of a capacitance between the in-loop branched radiation electrode and the radiation electrode extended from the feeding portion to the branching portion.

12. An antenna device comprising a substrate and the surface mount antenna according to claim 1.

13. An antenna device according to claim 12, wherein the substrate has a ground electrode provided at least in an area excluding a mounting area for the surface mount antenna, and the surface mount antenna is provided on a non-ground area of the substrate.

14. An antenna device according to claim 12, wherein at least one non-feeding radiation electrode, in addition to the loop-shaped radiation electrode, is disposed on the dielectric substrate, and is arranged at an interval relative to the loop-shaped radiation electrode and is electromagnetically coupled to the loop-shaped radiation electrode, whereby the non-feeding radiation electrode together with the loop-shaped radiation electrode in a higher-order mode generates a double resonance state.

15. An antenna device according to claim 14, wherein one-end side of the non-feeding radiation electrode is connected to the ground electrode of the substrate via a circuit having an inductance disposed on the substrate.

16. A communication device comprising the surface mount antenna according to claim 1.

17. A communication device comprising the antenna device according to claim 12.

18. A communication device comprising the antenna device according to claim 14.

19. A communication device comprising the antenna device according to claim 15.

* * * * *